United States Patent [19]

Juy, deceased

[11] 4,185,510
[45] Jan. 29, 1980

[54] SPEED CHANGE DEVICE WITH DETENT MEANS

[75] Inventor: Lucien C. H. Juy, deceased, late of Dijon, France, by Henri Juy, heir

[73] Assignee: Etablissements le Simplex, Dijon, France

[21] Appl. No.: 746,786

[22] Filed: Dec. 2, 1976

[30] Foreign Application Priority Data

Dec. 2, 1975 [FR] France ................. 75 37864
Mar. 1, 1976 [FR] France ................. 76 06595

[51] Int. Cl.² ................ F16H 7/22; F16H 11/08
[52] U.S. Cl. ..................... 74/217 B; 280/238
[58] Field of Search ......... 74/217 B, 242, 242.11 B; 280/236, 237, 238

[56] References Cited

U.S. PATENT DOCUMENTS

| 2,428,166 | 9/1947 | Letouneur | 74/217 B |
|---|---|---|---|
| 2,431,513 | 11/1947 | Schwinn | 74/217 B |
| 3,903,751 | 9/1975 | Dian | 74/217 B |
| 3,960,025 | 6/1976 | Juy | 74/217 B |
| 3,974,707 | 8/1976 | Nagano | 74/217 B |
| 3,979,962 | 9/1976 | Kebsch | 74/217 B |
| 4,132,119 | 1/1979 | Nagan et al. | 74/242.11 B |

FOREIGN PATENT DOCUMENTS

| 2654426 | 6/1977 | Fed. Rep. of Germany | 74/242.11 B |
|---|---|---|---|
| 764366 | 3/1934 | France | 74/217 B |
| 984436 | 2/1951 | France | 74/217 B |
| 530913 | 12/1940 | United Kingdom | 74/217 B |

Primary Examiner—Samuel Scott
Assistant Examiner—William R. Henderson
Attorney, Agent, or Firm—Haseltine, Lake & Waters

[57] ABSTRACT

A speed change device for a bicycle comprising an upper fixed transverse support and a lower movable transverse support carrying a chain guide and movable with the lower support to derail a chain with respect to a set of pinions of graduated size on a free wheel to change the gear ratios. An articulated parallelogram linkage connects the upper and lower supports to permit transverse displacement of the lower support; a pivotal member is pivotably mounted on the upper support and is adjustably connected to the lower support and a control cable is attached to the pivotal member at a pair of locations on opposite sides of the pivot axis thereof to pivot the pivotal member under the control of the cyclist and produce transverse displacement of the lower support and the chain guide thereon. The pivotal member and the upper support carry a detent arrangement for establishing stop positions corresponding to the engagement of the chain with the respective pinions on the free wheel. The detent arrangement is constituted by a plurality of recesses in one of the members equal in number to the speed changes and a projection in the form of a spring-loaded member selectively engageable in the recesses as the pivotal member undergoes pivotal movement between speed changes.

18 Claims, 21 Drawing Figures

SPEED CHANGE DEVICE WITH DETENT MEANS

FIELD OF THE INVENTION

The invention relates to speed change devices for bicycles and similar vehicles.

The invention also relates to apparatus for changing speed by derailing a chain.

BACKGROUND

Speed change devices for bicycles and similar vehicles are known some of these are fixed to the frame on or near the axle of the rear wheel. These speed change devices generally comprise a chain-guide system having one or more wheels with which the chain of the bicycle is engaged. By transversely displacing the chain-guide with its wheel, one can engage the chain as desired on one of the pinions of a free wheel cluster on the rear wheel of the bicycle.

This transverse displacement is remotely controlled by the cyclist by a lever or control button, most often but not exclusively, through the intermediary of a flexible cable system. To this effect, the chain-guide with its wheel can be carried by a system having a deformable articulated parallelogram which is constituted by levers pivoted to an upper support and to a lower support. The latter carries the chain-guide with its wheels by an elastic pivotal mounting of the chain-guide in order to constantly retain the necessary tension in the chain for proper operation.

It is known that it is difficult for the cyclist to control the transverse displacement of the chain-guide in a manner to align, with the required precision for proper operation, the chain and the teeth of the pinion corresponding to the selected speed. Frequently, the cyclist hunts for and passes the speed that he wants to engage. Then, the chain is not correctly aligned with the teeth of the pinion. There is thus produced friction and wear. In brief, the rider does not feel the correct transverse positions of passage of the speeds for each speed. The search for the correct position can, moreover, dangerously distract his attention.

Devices have been proposed for selecting the speeds which devices have serious disadvantages due either to their complexity and their cost or because they do not effect initial adjustment with respect to the teeth of the first pinion or by their unpleasing geometry and providing projecting members constituting dangerous points of contact.

SUMMARY OF THE INVENTION

According to the invention, the positioning of each of the speeds is made perceptible to the cyclist under the simplest and most advantageous conditions of construction with perfect efficiency while eliminating the disadvantages of the known systems.

To this effect, a speed-change device, pre-positioned for each speed according to the invention, is characterized by the use of a pivotal member pivotably mounted on the upper support of the speed change device, the said support having a transverse fixed position, the pivotal member being so constructed and arranged as to have a dual function. On the one hand, the dual function provides for control of the speed change by one or more points of attachment on opposite sides of the pivotal axis of the pivotal member for the extremities of a control cable or other control means, the lower portion of the pivotal member being connected, with latitude for necessary displacement, to a lower transversely movable support and carrying the chain-guide. The dual function provides a positioning function by presenting as many positioning points or hollows as there are possible speeds, each of these points or hollows successively cooperating with a complementary means carried by the upper support or transversely fixed member, in order to mark the position of each speed in a manner perceptible to the cyclist.

According to a variation, modified and substantially improved arrangements are proposed, notably with regard to the smoothness of operation, simplicity of manufacture and long life for one or more control cables which are subjected to repeated action.

According to a first feature of this variation, the portions at the extremities of the one or more control cables, which are fixed to the pivotal member, bear, before being fixed, in one or more tracks or throats in concentric circular arrangement around the pivot axis of the pivotal member and solid with the said member, such that whatever the angular position of the pivotal member, the control forces on this member are exerted through moment arms of constant length and provide a constant drive couple assuring the regularity of the control force, and the smoothness of operation of the amplitude of angular displacement of the lever of the handle.

Another feature is found in the tangential alignment of the throats with the extremities of the one or more cables in passage openings in the upper support portion forming holders for the sheaths in a manner that avoids wear and contact in the said portion forming the sheath holder.

The above features and still further features will be found in the following detailed description.

BRIEF DESCRIPTION OF THE DRAWING

In order to inable understanding of the invention, preferred constructions are shown in the annexed drawings in which.

DETAILED DESCRIPTION

In order to explain the objects of the invention, there will now be described in non-limitative manner the embodiments shown in the figures of the drawings.

Figures 1, 2, 3:
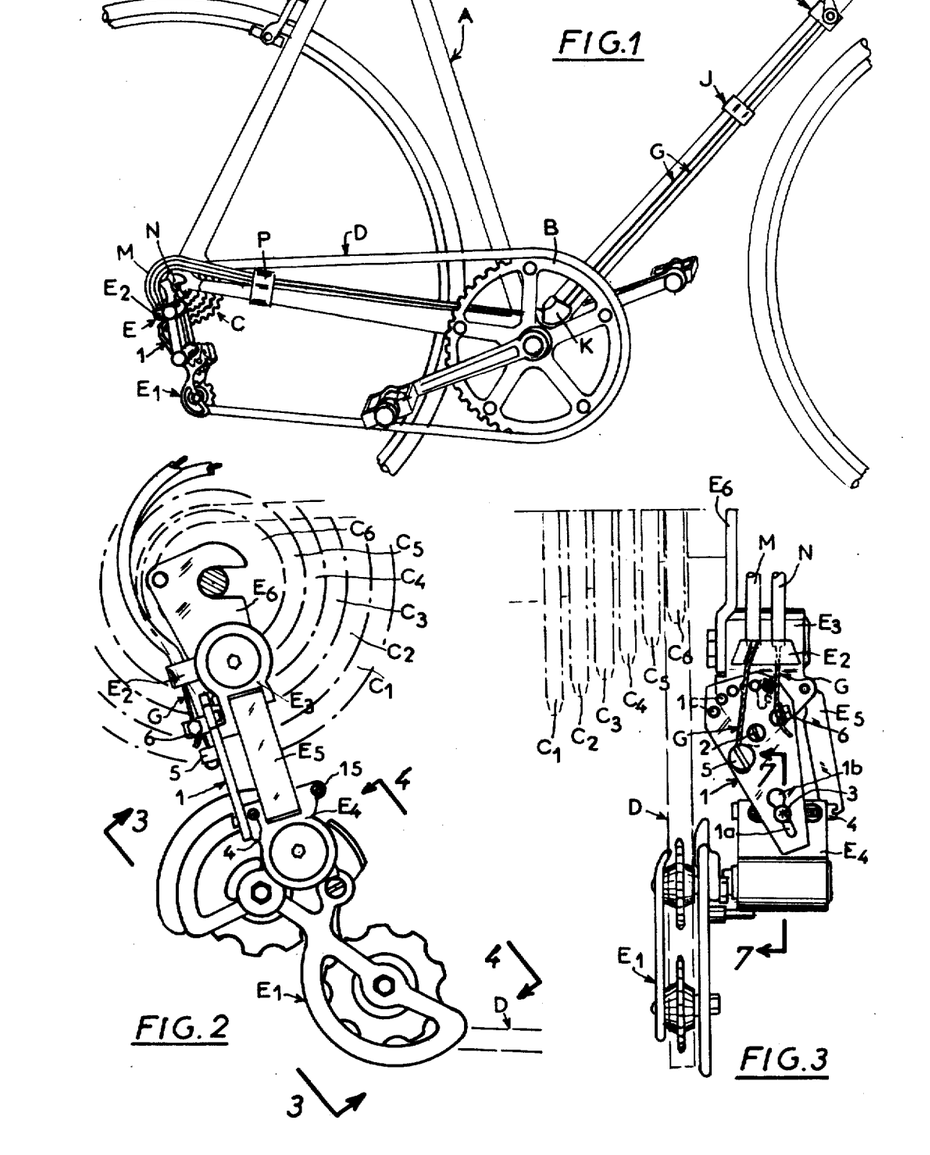
FIG. 1 is an elevational view of a portion of a bicycle equipped with the speed change device according to the invention with a dual control cable.
FIG. 2 is an elevational view, on a much enlarged scale, of a modification of the speed change device according to the invention.
FIG. 3 is a rear end view seen along line 3—3 of FIG. 2, the speed change device being in a position where the chain is wound on the smallest pinion of the free wheel cluster.

There is seen in FIG. 1 a frame A of a bicycle whose pedal spoke wheel B is connected to the free wheel cluster C of the rear wheel by a chain D which is tensioned by the speed change device E which is, in the illustrated embodiment, of the deformable parallelogram type. Other types of speed change devices can be substituted.

The free wheel cluster C comprises a number of pinions $C^1$, $C^2$, $C^3$, $C^4$, $C^5$, $C^6$, ... $C^n$ of different diameters and with a different number of teeth corresponding to a selected speed.

To effect the derailment of the chain from one or the other of the pinions through the intermediary of the speed change device, the cyclist acts generally on a lever F or a button, handle or similar member fixed on the frame in such a position as to be accessible to the hand of the cyclist. The connection between the manual means and the speed change device is of known type such as a cable.

In conventional speed change devices, action on the cable generally effects the displacement of the chain-guide having wheels $E^1$ smaller than the largest diameter pinion of the free wheel cluster. A spring returns the chain-guide when the cyclist acts in reverse direction on the manual means.

Within the scope of the invention, it is necessary that the displacement in the two directions of the chain-guide be effected positively, that is to say, by a cable having two parallel lengths or by two distinct cables, suitably wound on the manual means and attached to the speed change device at two different points.

There is seen in FIGS. 1, 2, 3 and 5, particularly, the lengths of the cable G secured to the frame by collars or cable guides J, K, ..., the cable traversing the cable sheaths M and N being maintained in this position by the sheath holder P on the frame and by the sheath holder $E^2$ on the speed change device.

The speed change device has an upper fixed support $E^3$ carrying the sheath holder $E^2$ and a movable lower support $E^4$ carrying the chain-guide $E^1$. The two supports are connected in known manner by parallel arms $E^5$. A plate $E^6$ elastically articulated to the upper support serves for the attachment of the speed change device to the axle of the rear wheel.

Figure 6:
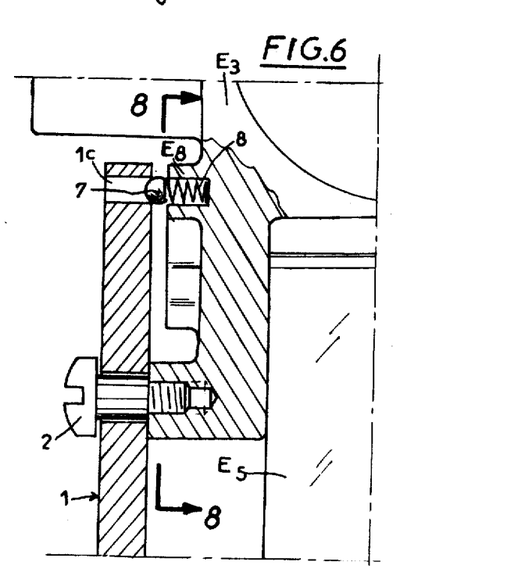
FIG. 6 is a view partially in section on enlarged scale taken along line 6—6 in FIG. 5 showing the mounting of the pivotal member on the upper support of the speed change device, as well as its positioning with respect to the said support.
Figure 7:
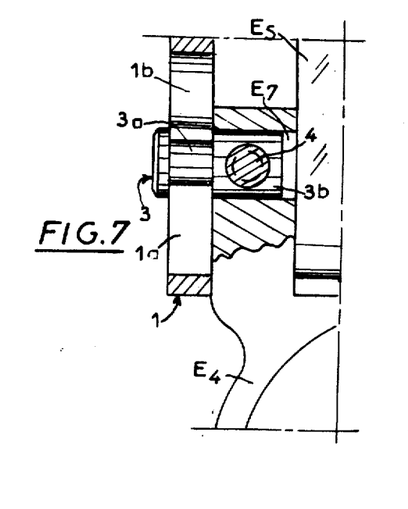
FIG. 7 is a partial sectional view on enlarged scale taken along line 7—7 in FIG. 3 showing the adjustable connection of the pivotal member with the lower support of the speed change device.

The speed change device according to the invention has a pivotal member 1 in the form of a plate of metal or plastic material or the like which is pivotably mounted for free movement by a bolt or pivot axis 2 or the like on the upper support $E^3$ (see FIG. 6).

At its lower end, the pivotal member 1 has a slot or notch 1a defining a longitudinal axis and whose upper portion 1b is enlarged for permitting the passage, for mounting or demounting, of a stud or finger 3 having a shank 3a for slidably retaining the pivotal member and whose extremity 3b is perpendicularly traversed by the threaded shank of a screw 4 mounted for free rotation, but fixed in translation, on the lower support $E^4$ or on a piece connected thereon. The extremity 3b of the finger can slide freely in a groove or slot $E^7$ in the lower support $E^4$ which traverses the screw 4 whose head is accessible and shaped in order to be turned easily by a screw driver type tool (FIGS. 2, 3, 5 and 7).

It is understood that one can precisely adjust the position of the lower support with respect to the fixed upper support as a function of the number of pinions of the free wheel cluster or of its dimensions, that is to say, the adjustment of the position of the chain-guide $E^1$ with respect to the smallest pinion (FIG. 3). The pivotal member 1 has two functions, namely, control of the passage of the speeds and precise positioning of the selected speeds.

For the operation of the control of the passage of the speeds, as given previously, one or more cables after having traversed the sheaths M and N and the sheath holder $E^2$ are attached to the pivotal member in the following manner: a length of cable G carrying at its extremity a ball or other shape is engaged in a cable holder 5 mounted for free rotation on the bolt or pivotal member on one side of the pivotal axis 2, and the other length of the cable is locked under suitable tension in a cable lock 6 also mounted for free rotation on the pivotal member, in opposition to the cable holder 5 with respect to the pivot axis 2.

It is understood that when the cyclist acts on the manual means F on which the cable is wound in known manner he effects pivoting of the pivotal member by tension in one or the other lengths of the cable.

For the operation of precise positioning of the speeds, there are provided a number of embodiments which are illustrated without limitation in the drawings.

According to FIGS. 2 to 5, the pivotal member has at its upper extremity extending above the upper support $E^3$ orifices or openings $1c$ positioned along an arc of a circle whose center is the pivotal axis 2. These orifices constitute detent structure stops and successively cooperate with a ball 7 of much greater diameter partially engaged with reduced play in a housing $E^8$ of the upper support and constantly urged against the pivotal member by a spring 8 (FIG. 6).

There are as many orifices $1c$ as there are pinions on the free wheel cluster (6 in the illustrated example).

Figure 9:
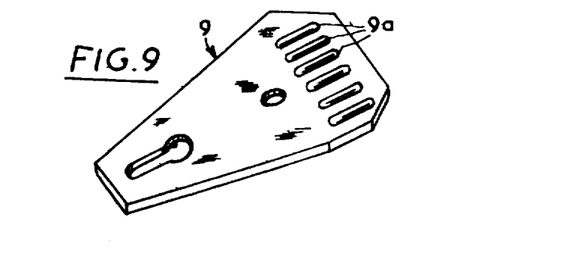
FIG. 9 is a perspective view showing a pivotal mounting according to another embodiment.
Figure 10:
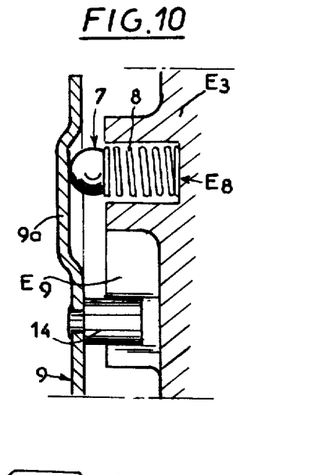
FIG. 10 is a view partially in section on enlarged scale of the pivotal member of FIG. 9 cooperating with the positioning means mounted on the upper support of the speed change device.

In the embodiment illustrated in FIGS. 9 and 10, the pivotal member 9 has, instead of the orifices $1c$, recesses or depressions $9a$ extending parallel to one another at a determined spacing to effect the exact positioning of the chain on each of the pinions. These recesses or depressions can also be arranged along an arc of a circle.

Figure 11:
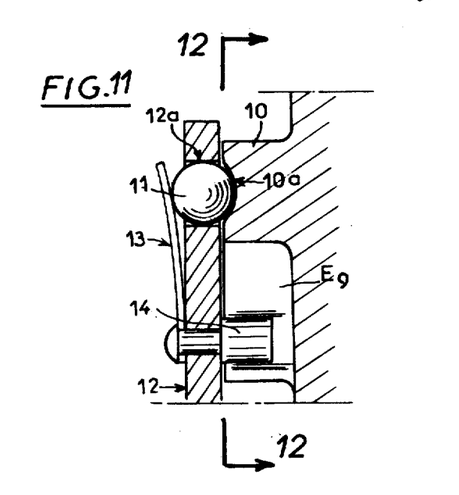
FIG. 11 is a partial sectional view on enlarged scale showing another embodiment for the positioning of the pivotal member.
Figure 12:
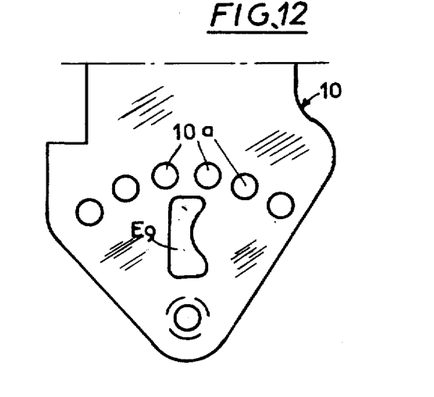
FIG. 12 is a view on a much reduced scale along line 12—12 of FIG. 11 of the upper support.
Figure 13:
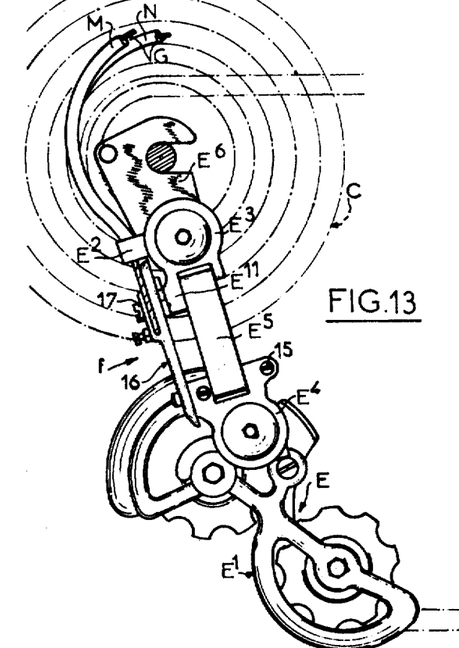
FIG. 13 is a front view of the speed change device fixed on the rear wheel and equipped with the pivotal positioner member according to a modification.
Figure 14:
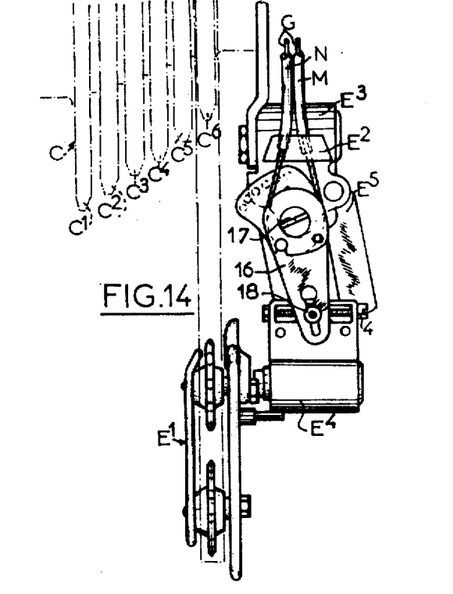
FIG. 14 is a rear view along arrow "f" in FIG. 13 of the speed change device shown in position on the smallest pinion of the free wheel cluster.
Figure 15:
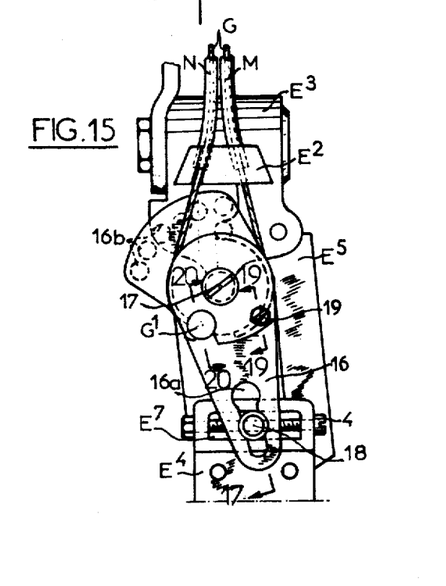
FIG. 15 is a partial view on enlarged scale similar to FIG. 14.
Figure 16:
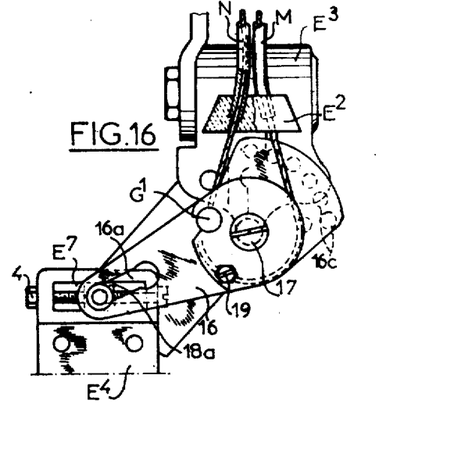
FIG. 16 is a partial rear view showing the speed change device in position on the largest pinion of the free wheel cluster.
Figure 17:
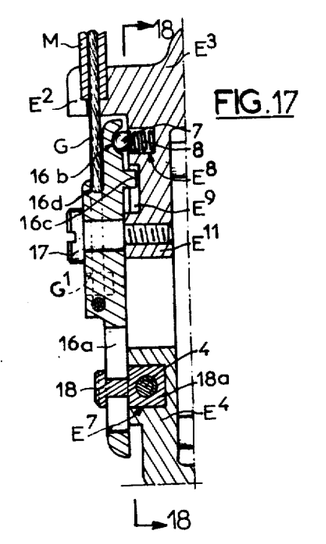
FIG. 17 is a partial sectional view taken along line 17—17 in FIG. 15 showing the details of mounting of the pivotal positioner member on the speed change device.

In another embodiment illustrated in FIGS. 11 and 12, orifices or depressions $10a$ are formed on the upper support 10 of the speed change device along an arc of a circle having its center at the pivot axis of the pivotal member and the ball 11 is placed in an orifices $12a$ of the pivotal member 12 while projecting from each side. An elastic means 13 fixed on the pivotal member retains the ball while yieldingly permitting it to escape from the depressions.

In order to exactly limit the displacement of the chain-guide and not allow it to pass beyond the extreme positions, stops or abutments are provided at the end of travel.

Figure 8:
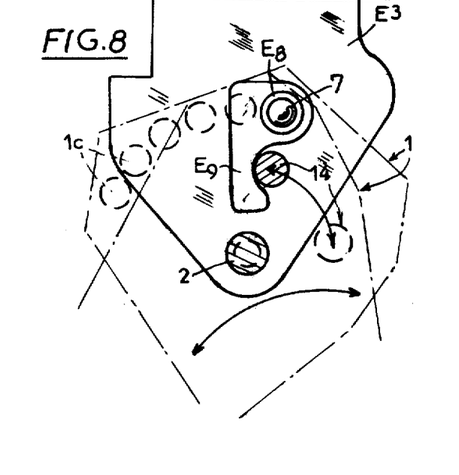
FIG. 8 is a partial sectional view on enlarged scale taken along line 8—8 in FIG. 6 showing the abutment device in the position where the chain is wound on the smallest pinion of the free wheel cluster.

In FIG. 8, particularly, it is seen that the upper support $E^3$ has a boss $E^9$, for example, with a concave surface against which abuts a finger or projection 14 or similar member mounted in fixed or adjustable manner on the pivotal member when the chain-guide is placed on the smallest pinion of the free wheel cluster.

Figure 4:
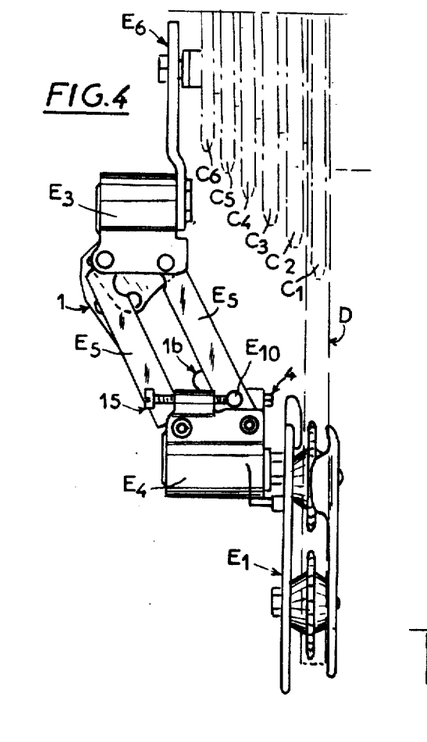
FIG. 4 is a front elevation view of the speed change device according to the invention seen along line 4—4 in FIG. 2. The speed change device is in a position where the chain is wound on the largest pinion of the free wheel cluster.
Figure 5:
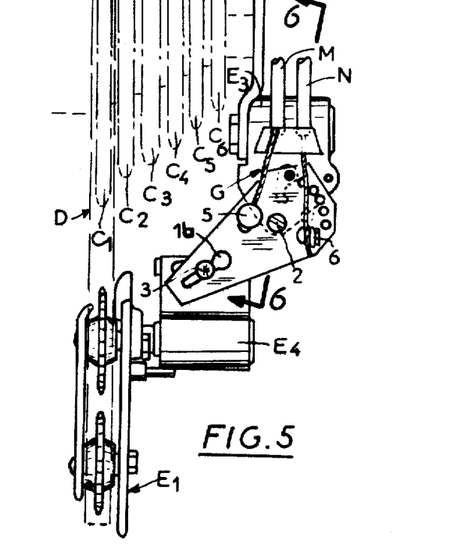
FIG. 5 is a rear view similar to FIG. 3, the speed change device being in a position where the chain is wound on the largest pinion of the free wheel cluster.

Similarly, when the chain-guide is placed on the largest pinion of the free wheel cluster, an abutment fixes this position. This abutment is constituted, for example, by a projection $E^{10}$ (FIG. 4) formed on one of the levers or arms $E^5$ against which bears a screw 15, or the like, mounted on the lower support $E^4$ and adapted for being provided with a friction surface or the like (FIG. 4). These two abutments can be fixed or adjustable in order to adapt to all free wheel cluster mountings.

It is to be further noted that portion $3b$ of finger 3, which is traversed by the bolt 4 for regulating alignment, can be equipped with a friction surface by placing a piece of suitable plaster on the screw or the finger forming a nut or by an elastic device.

The speed change device E illustrated according to the variation in FIGS. 13–21 is also of the type having a parallelogram device and comprising an upper fixed support $E^3$ with its plate $E^6$ for attachment at the axle of the rear wheel and a holder or abutment $E^2$ for the sheaths M and N of one or more control cables G. The upper support is connected by the parallel levers $E^5$ to a movable lower support $E^4$ carrying the chain-guide $E^1$.

The speed change device shown permits the passage of the chain to account for six speeds; that is to say, the free wheel cluster has six pinions $C^1$–$C^6$.

Of course, the speed change device and its pivotal positioner member can be utilized without modification for a number of different pinions. It is sufficient to limit the displacement of the chain-guide by adjusting the abutment 15 carried by the lower support and acting on a projection of one of the levers.

According to this embodiment, the pivotal positioner member 16 (FIG. 14) is also articulated on a bolt or axis of rotation 17 screwed into a projection $E^{11}$ on the upper support $E^3$ and connected to the lower support $E^4$ by a stud 18 traversing oblong opening $16a$ formed at the lower portion of the member 16. The stud 18 is extended by a block $18a$ slidably mounted in the groove $E^7$ in the lower support and traversed by the threaded rod 4 adjustable from the exterior to regulate the position of the chain-guide with respect to a pinion of the free wheel cluster.

As before, the upper portion of the pivotal positioner member has depressions $16b$ (spherical caps or dimples) arranged along an arc of a circle whose center is at the axis of bolt 17, the depressions $16b$ facing the upper support $E^3$ where an orifice $E^8$ receives a spring 8 constantly urging a ball 7 against the lower face of the member 16, that is to say, into one of the depressions.

Of course, the reverse arrangement could be used in that, namely, the depressions could be on the upper support and the spring-loaded ball on the pivotal positioner member.

Figure 18:
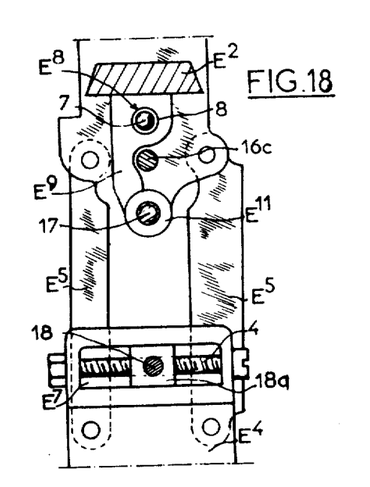
FIG. 18 is a view in partial section taken along line 18—18 in FIG. 17.

With further reference to the preceding embodiment, in FIG. 18, an abutment is seen constituted by a concave boss $E^9$ on the upper support against which abuts a projection $16c$ of the member 16 when the chain-guide is adjusted to be in alignment with the smallest pinion of the free wheel cluster.

The control for change of the speeds of angular displacement of the member 16 which is the main object of this embodiment, is effected in the following manner:

The bottom of sheaths M and N are secured in holder $E^2$, one or more cables which traverse them pass through the lower orifices of this sheath holder and are attached to the pivotal positioner member at two opposed points sitiuated at equal distances from the axis of rotation 17 (FIG. 16) and below this axis. Between the attachment points and sheath holder $E^2$, the cables bear against a throat or shape equivalent to a sector $16d$, formed on a boss $16e$ of the pivotal positioner member in a manner concentric to the axis of rotation 17. This throat extends over an angle much greater than 180° in order to lead the extremities of the cables up to the points of attachment over a natural curve and into tangential contact in the extreme positions of the member 16.

It is not impossible for the throat or equivalent means for guiding the extremities of the cable to be formed on an element connected to the member 16 and fixed thereto in any suitable manner, such as for example, by adhesives, screws, riveting, or welding.

Figure 19:
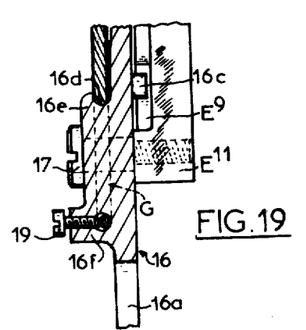
FIG. 19 is a view in partial section taken along line 19—19 in FIG. 15 showing the attachment of one extremity of the control cable to the pivotal positioner member.
Figure 20:
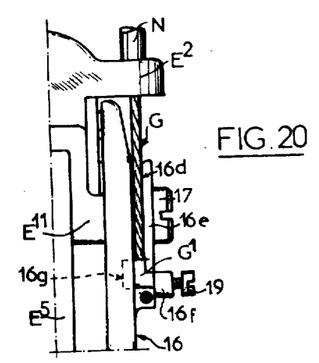
FIG. 20 is a partial view taken along line 20—20 of FIG. 15 showing the movable mounting of the other extremity of the control cable on the pivotal positioner member.
Figure 21:
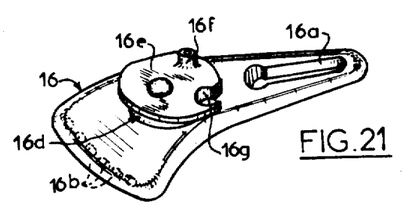
FIG. 21 is a perspective view of the pivotal positioner member according to one embodiment.

The points of attachment of the extremities of the cable are more particularly illustrated in FIGS. 19 and 20 wherein it is seen that one extremity of the cable passes in the terminal closed portion of the throat $16d$ into which projects a bolt 19 threaded in a boss $16f$ and adapted to lock the extremity of the cable by a clamping action (FIG. 19). The other extremity of the cable, formed in known manner with a cylinder $G^1$ or equivalent projection on the cable and, engages in a corresponding housing $16g$ of the member 16 formed at the level of the other terminal portion of the throat $16d$ (FIG. 20).

It is understood that with this arrangement of the points of attachment of the extremities of the cable and their passage in the throat, the control forces on the pivotal positioning member act with constant lever arms and produce a constant drive couple (FIGS. 15 and 16), whatever the angular position of the pivotal positioning member, thus assuring proper adjustment of the force, great smoothness of operation and greater angular displacement of the control lever.

Furthermore, the alignment of the throat or shape for tangential bearing of the extremities of the cable with the orifices for passage of the cables in the sheath holder guarantees the continued connection of the cables over a period of time while avoiding wear by friction against the said sheath holder.

Furthermore, this passage of the cables on the throat permits simplification of the attachment points which have no need for being free in rotation on the pivotal positioning member.

The pivotal positioning member and its throat or equivalent guide means for the extremities of the cable can be made as a one-piece body or as two distinct pieces of plastic material, lightweight alloy or other metal.

The advantages follow clearly from the description and in particular the following are underlined:

Simplification of the arrangement with respect to the known apparatus by the realization of a single member which is both a pivotal member and a positioner member and which is universal, that is to say, a single configuration is utilized whatever the number of pinions on the free wheel cluster (by adjustment of the abutments).

No significant modifications of the structure or of the speed change device.

No dangerous projections as is avoided by the careful shaping of the pivotal member which does not significantly project from the speed change device whatever its position.

Possibility of rapid and precise adjustment of the alignment with the smallest pinion on the free wheel cluster by the mounting of the pivotal member on the lower support of the speed change device.

Precise limitation of the extreme positions of the guide-chain by the adjustable abutments.

Positive control in two directions of the speed change device by means of one or more control cables attached to the pivotal member.

Clear perception without groping for the selected speeds.

What is claimed is:

1. A speed-change apparatus for derailing a chain on the pinions of a free wheel cluster by cable means for each of a plurality of speeds and capable of incorporation into chain-driven bicycles and similar vehicles for use by a cyclist, said apparatus comprising an upper fixed transverse support, a lower movable transverse support, a chain guide coupled to said lower support and movable therewith to derail the chain, linkage means coupled between the upper support and the lower support for displacing said lower support transversely, control means for effecting the transverse displacement of the lower support and comprising a pivotal means constituted by a single part mounted pivotably on said upper support, said upper support having a transverse fixed position, the pivotal means having a pivotal axis and being constructed and arranged to have three functions including, firstly, a control function for the control of speed change by at least one point of attachment. on opposite sides of the pivotal axis of the pivotal means to the extremities of the cable means, the pivotal means having a lower portion connected, with latitude for displacement, to the lower transversely movable support, secondly, a positioning function by presenting as many positioning zones as there are possible speeds, and thirdly an adjusting function for adjusting the positioning zones in relation to a pinion of the free wheel cluster, the apparatus further comprising a complementary means, each of said zones being adapted to cooperate successively with said complementary means in order to mark the position of each speed in a manner perceptible to the cyclist, said complementary means being carried by the upper support, adjusting means for adjusting the transverse position of the chain guide for positioning the chain with respect to a pinion of the freewheel cluster, and means connecting said single part with said adjusting means in coupled relation for adjusting said single part to achieve said adjusting function at said positioning zones.

2. A speed-change apparatus according to claim 1 wherein said pinions are of graduated diameters on said freewheel cluster, said means for adjustment of the transverse position of the chain guide being operative with respect to the first pinion on the free wheel cluster having the smallest diameter, said means which connects the single part with the adjusting means being constituted by a finger connected with the lower support and engaged in a slot provided in the pivotal means, the position of the finger being adjustable with respect to the lower support.

3. A speed-change apparatus according to claim 2 wherein said adjusting means comprises a turnable bolt, said finger cooperating with said turnable bolt, said bolt being transversely mounted in a fixed axial position in the movable lower member, the bolt including a slotted head permitting angular rotation thereof in order to effect adjustment, and means for developing friction acting between the bolt and the finger in order to assure the position of adjustment.

4. A speed-change apparatus according to claim 2 comprising a system of abutments limiting the pivotal movements of the pivotal means in both directions whereby the chain-guide cannot extend beyond the extreme pinions.

5. A speed-change apparatus according to claim 4 wherein, in the direction of transverse displacement of the largest to the smallest pinion of the free wheel cluster, the pivotal means includes a projecting abutment cooperating with a corresponding abutment on the upper support, at least one of the abutments being adjustable.

6. A speed-change apparatus according to claim 4 wherein the linkage means comprises an articulated parallelogram linkage, said apparatus further comprising fiction means and a further abutment and wherein, in the direction of transverse displacement of the smallest to the largest pinion of the free wheel cluster, the displacement is limited by said further abutment which is formed between two levers of the parallelogram, in the form of a projection which faces one of the levers, the other lever including a screw for adjustable contact with said friction means coming into contact with said projection.

7. A speed-change apparatus according to claim 1 wherein the pivotal means is provided with holes and depressions at said positioning zones formed on a circle whose center coincides with the pivotal axis of the pivotal means.

8. A speed-change apparatus according to claim 1 wherein the position for each speed is established and made perceptible by notches provided in the pivotal means at said positioning zones with a spacing assuring exact positioning of the chain on each one of the pinions of the free wheel cluster.

9. A speed-change apparatus according to claim 1 wherein the position for each speed is established and made perceptible by detent means on said upper support cooperating with said complementary means.

10. A speed-change apparatus according to claim 1 comprising a sector portion on said pivotal means and on which said cable means extends to the points at which the extremities of the cable means are fixed to the pivotal means, said sector portion being concentric with the pivotal axis of the pivotal means and being fixed with said single part such that, whatever the angular position of the pivotal means, the control forces on the same by said cable means are exerted with constant lever arms and produce a constant drive couple assuring regularity of the control force and smoothness of operation.

11. A speed-change apparatus according to claim 10 wherein said sector portion includes throats for said cable means and the pivotal means and the sector portion are formed as a single piece.

12. A speed-change apparatus according to claim 10 wherein said sector portion includes throats for said cable means and the sector portion and pivotal means are secured together.

13. A speed-change apparatus according to claim 10 wherein said cable means include two cable lengths which pass through said throats and are fixed at two opposed points to the pivotal means at equal distances from said pivotal axis and below said axis.

14. A speed-change apparatus according to claim 13 wherein one of the extremities of one of the cable lengths is fixed to the pivotal means by passing through one of the throats and is locked therein by a screw extending into this throat.

15. A speed-change apparatus according to claim 13 wherein the extremity of the other cable length carries a projection engaged in an opening in the pivotal means at the end of the associated throat at a level opposite said screw.

16. A speed-change apparatus according to claim 3 wherein the friction developing means comprises an elastic device.

17. A speed-change apparatus according to claim 3 wherein the friction developing means comprises a plastic member.

18. A speed-change apparatus according to claim 10 wherein said cable means comprises two cable lengths in respective sheaths, said sector portion extending over an angle greater than 180° such that the cable lengths always tangentially bear in alignment with respect to the sheaths in the extreme positions of said pivotal means.

* * * * *